United States Patent [19]
Christopherson

[11] Patent Number: 5,848,444
[45] Date of Patent: Dec. 15, 1998

[54] HYDROTHERAPY JET WITH ARTICULATING JOINTS

[75] Inventor: Willard E. Christopherson, Corona del Mar, Calif.

[73] Assignee: Hydro Air Industries, Inc., Orange, Calif.

[21] Appl. No.: 932,431

[22] Filed: Sep. 17, 1997

[51] Int. Cl.$^6$ .................................................. A61H 33/04
[52] U.S. Cl. ........................... 4/541.6; 4/541.4; 4/541.3; 4/541.1; 239/587.3
[58] Field of Search .................. 4/492, 541.3, 541.4, 4/541.6, 541.1, 541.2, 541.5; 239/587.2, 587.3, 588

[56] References Cited

U.S. PATENT DOCUMENTS

| | | | |
|---|---|---|---|
| 3,985,303 | 10/1976 | Steimle | 4/541.6 |
| 4,420,846 | 12/1983 | Bonner | 4/541.6 |
| 4,508,665 | 4/1985 | Spinnett | 4/541.6 |
| 4,523,340 | 6/1985 | Watkins | 4/541.6 |
| 4,671,463 | 6/1987 | Moreland et al. | 4/541.6 |
| 4,679,258 | 7/1987 | Henkin et al. | 4/541.6 |
| 4,689,839 | 9/1987 | Henkin et al. | 4/541.6 |
| 4,692,950 | 9/1987 | Henkin et al. | 4/541.6 |
| 4,715,071 | 12/1987 | Henkin et al. | 4/541.6 |
| 4,716,604 | 1/1988 | Watkins | 4/541.6 |
| 4,726,080 | 2/1988 | Henkin et al. | 4/541.6 |
| 4,727,605 | 3/1988 | Henkin et al. | 4/541.6 |
| 4,742,965 | 5/1988 | Messinger et al. | 4/541.6 |
| 4,763,367 | 8/1988 | Henkin et al. | 4/541.6 |
| 4,813,086 | 3/1989 | Henkin et al. | 4/541.6 |
| 4,825,854 | 5/1989 | Henkin et al. | 4/541.6 |
| 4,965,893 | 10/1990 | Henkin et al. | 4/541.6 |
| 5,667,146 | 9/1997 | Pimentel et al. | 239/587.3 |

FOREIGN PATENT DOCUMENTS 3268758  11/1991  Japan ...................................... 4/541.6

Primary Examiner—Henry J. Recla
Assistant Examiner—Tuan N. Nguyen
Attorney, Agent, or Firm—Knobbe, Martens, Olson & Bear, LLP

[57] ABSTRACT

An articulated jet structure which is mountable on the wall of a tub or spa, and which can be moved into a variety of positions to deliver a pulsed air/water stream to a desired location. More specifically, the hydrotherapy jet which extends from the wall of the hydrotherapy spa can be directed to any number of desired positions and will maintain the desired position while the pulsed air/water stream is delivered to the spa occupant. The hydrotherapy jet comprises a housing and an articulated or flexible section. The mixing of water and air occurs in the housing forming an air/water stream which is delivered to the articulated section of the jet. The articulated section of the jet preferably comprises a plurality of articulating elements interconnected to provide a wide range of motion and which hold their position when released. These elements form a water tight conduit and deliver the air/water stream from the housing to a discharge nozzle on the end of the articulated section.

13 Claims, 2 Drawing Sheets

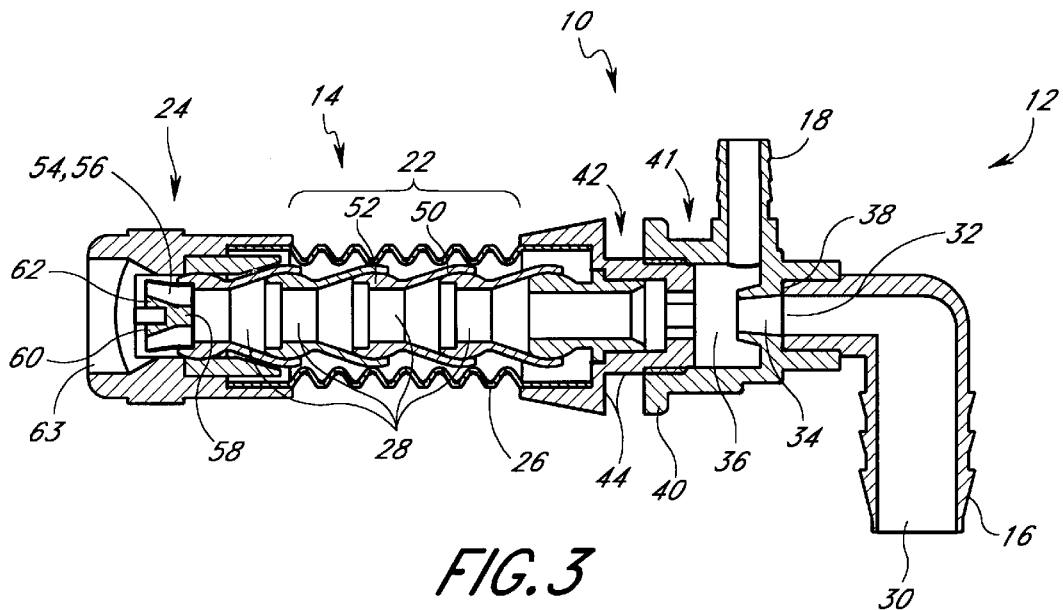
FIG.3
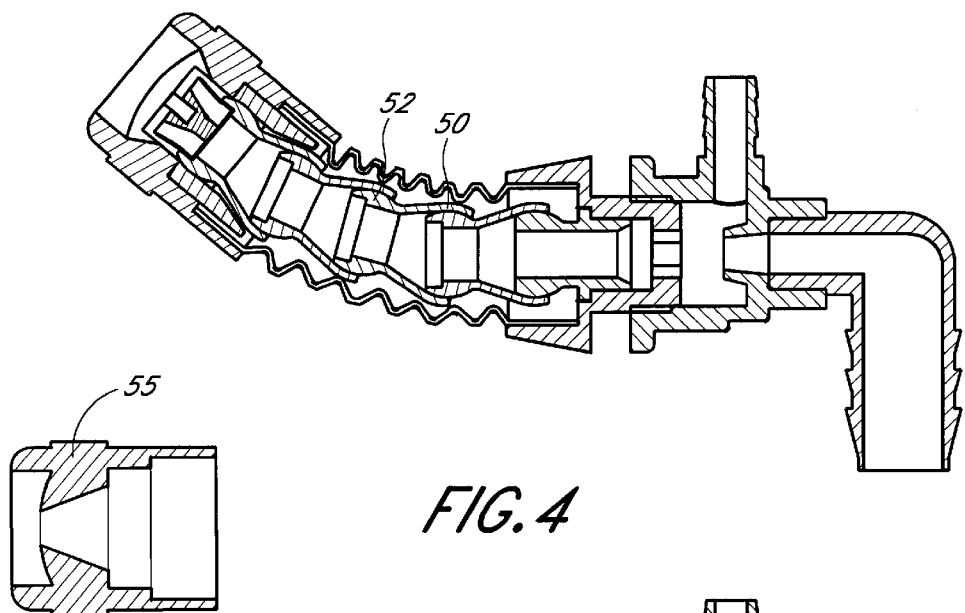
FIG.4
FIG.6
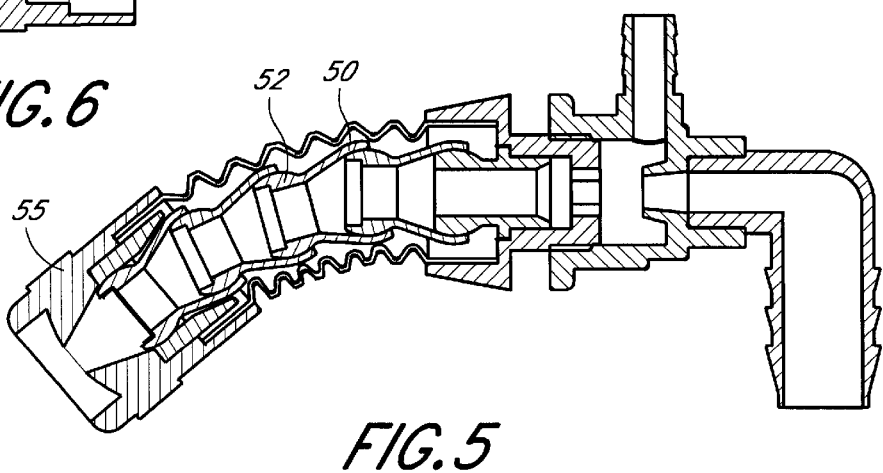
FIG.5

HYDROTHERAPY JET WITH ARTICULATING JOINTS

BACKGROUND

1. Field of the Invention

This invention generally relates to hydrotherapy jets for whirlpool spas and tubs, and more specifically to jets that direct a stream of water in different directions.

2. Description of the Related Art

Whirlpool spas typically include a tub for holding hot water, and a source of pressurized water, often a recirculating pump, which forces water into the tub in a stream or jet. Often, the tub will include a seat or bench area, and one or more water discharge openings above the bench to massage the back of a tub occupant. The water discharge openings are typically fitted with a device called a "jet" in the industry, which serves to form the water stream into a concentrated flow. In many such installations, the pressurized water flows through a nozzle or other restricted flow path, and exits the nozzle into a chamber which is supplied with a source of air. The air may be either at normal atmospheric pressure, or may be supplied to the jet under pressure. In either case, the pressurized water exits the nozzle at high velocity, and thus low pressure, to create a vacuum that draws air into the chamber for entrainment into the water stream as it exits into the tub. The presence of air in the water stream provides the occupant with a more stimulating massage than does water alone. However, in some instances water alone may be sent to the jet where pressurized water is not easily attainable, such as certain bathtub locations.

For many years, a variety of hydrotherapy jets have been manufactured which, in addition to mixing air with the pressurized water, include an outlet which moves to direct the water flow in a pattern to reach a variety of areas on the occupant that a typical static jet would not reach. Many of these moving outlet jets include a rotating element which includes a flow path that imparts a rotating force to the element, and directs the water flow at an angle to the axis of the jet, so that, as the outlet element rotates, the angled stream is directed in a circular pattern toward the tub occupant to reach a variety of areas on the occupant that a typical static jet would not reach. Other devices utilize the water force to move the jet in a random path to reach a larger area of the occupant. However, a jet which can be positioned to reach hard to reach locations without covering a large area of the body is not yet available.

Accordingly, it is an object of this invention to provide a hydrotherapy jet that can be positioned to hit specific areas of an occupant, and maintain that position until moved by the occupant.

SUMMARY OF THE INVENTION

The present invention provides a flexible jet structure which is mountable on the wall of a tub or spa, and which can be moved into a variety of positions to deliver an air/water stream to a desired location on the spa occupant. More specifically, the hydrotherapy jet which extends from the wall of the spa can be directed to any number of desired positions and will maintain the desired position while the air/water stream is delivered to the spa occupant.

The hydrotherapy jet comprises a housing or jet body, a water inlet attached to the housing, an articulated or flexible conduit extending from the housing opposite the water inlet, and an outlet nozzle on the end of the flexible conduit. The outlet nozzle may be a static output nozzle or a rotatable nozzle. The flexible portion of the jet preferably comprises a plurality of articulating elements interconnected to provide a wide range of motion and which hold their position when released. These elements form a water tight passageway that delivers the air/water stream to the outlet nozzle on the end of the flexible portion. While the friction between the interconnected articulating elements provides enough resistance to movement so that a pressurized air/water stream will not alter the position of the flexible portion, the resistance is low enough so that an operator can move the flexible portion into a number of positions, if desired. The resistance is also low enough so that if an occupant inadvertently collided with the flexible portion, no injury would result because the flexible portion would merely move away from the force associated with the collision.

In another embodiment, the hydrotherapy jet comprises a housing, a water inlet attached to the housing, an articulated or flexible conduit extending from the housing opposite the water inlet, an outlet nozzle on the end of the flexible conduit, and a supply of air which is mixed with the water in a chamber. In a preferred embodiment, the mixing of water and air occurs in the housing or jet body and the mixed air/water stream is delivered to the flexible section where the outlet nozzle is located. The air can be supplied through an air inlet and mixed with the water in the chamber in the housing. In addition, in one preferred embodiment, a water nozzle is located in the housing between the water inlet and the chamber. The mixing chamber may alternatively be located in the flexible portion, if desired.

In another embodiment, the housing and flexible portion of the jet are two separate parts that are connected using threads, glue, or another attachment means. The wall of the tub may be placed between the ends of the two parts, so that the mating ends of the housing and flexible portion sandwich the wall between them.

The hydrotherapy jet can be used in combination with a water tub or spa having a wall with an aperture and a source of water associated with the water tub to form a hydrotherapy system. The hydrotherapy jet is mounted within the tub wall aperture. The hydrotherapy jet comprises a housing connected to the source of water and a flexible portion extending into the tub with an outlet nozzle on the end of the flexible portion. In one embodiment, the water supply is under pressure. In another embodiment, the tub wall is placed between the housing and the flexible portion so that the flexible portion extends into the tub.

A method of operating the hydrotherapy jet comprises introducing a water stream to the housing, forcing the stream through the flexible portion, and positioning the jet in an aperture in a tub wall, with the flexible portion extending into the tub. In another embodiment, the method of operation may include the addition of air to the water stream by mixing the air and water in a chamber. The chamber, in one embodiment, is located in the housing, with the air being supplied through an air inlet.

These and other unique features and advantages of the present invention will be readily apparent to those skilled in the art from the following detailed description of the preferred embodiment with reference to the accompanying drawings, the invention not being limited, however, to any particular preferred embodiment.

BRIEF DESCRIPTION OF THE DRAWINGS

FIGS. 3, 4 and 5 are cross sectional views of a preferred embodiment of the invention, taken through the central axis of the generally cylindrical jet; and showing the jet in three articulated positions. Of these figures, FIG. 5 also shows an alternative outlet end which does not rotate;

FIG. 6 is a cross sectional view of the non-rotating outlet end of FIG. 5.

DETAILED DESCRIPTION OF THE PREFERRED EMBODIMENT

The present invention provides a flexible jet structure which is mountable on the wall of a tub or spa, and which can be moved into a variety of positions to deliver an air/water stream to a desired location on the spa occupant. More specifically, the hydrotherapy jet which extends from the wall of the hydrotherapy spa can be directed to any number of desired positions and will maintain the desired position while the air/water stream is delivered to the spa occupant.

Figure 1:
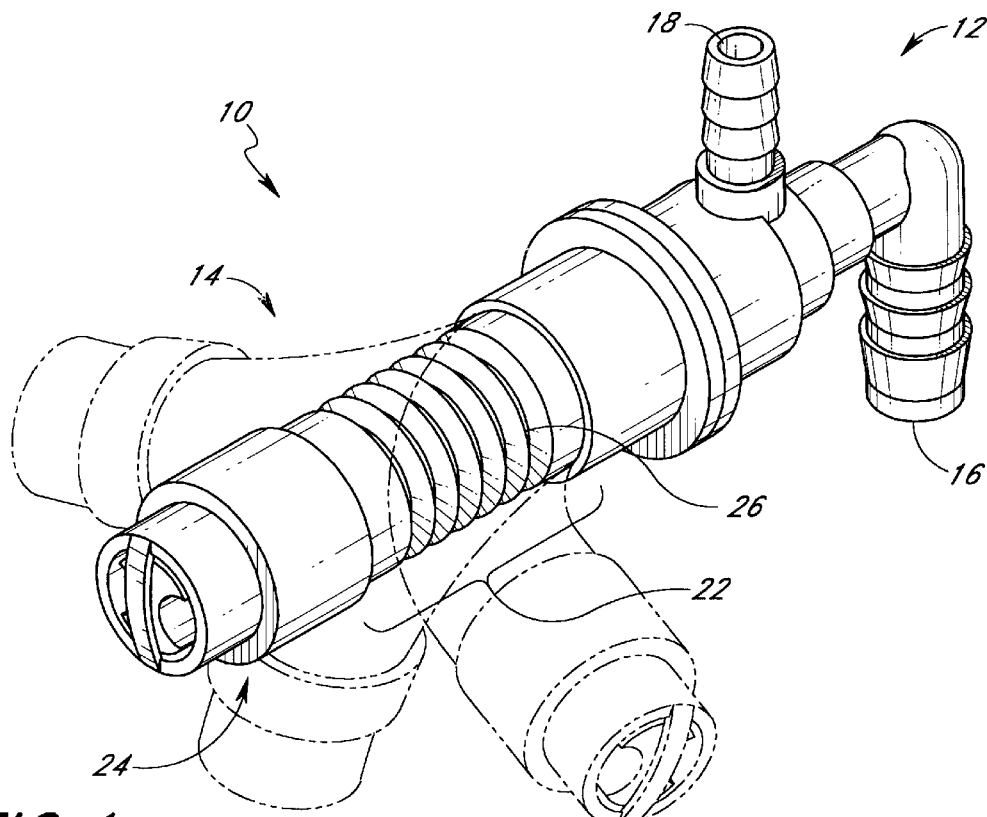
FIG. 1 is a perspective view of a preferred embodiment of the invention.

Referring to FIG. 1, the preferred embodiment of the jet 10 comprises a main jet body or housing member 12 and an articulated or flexible outlet portion 14 which is generally cylindrical in its outer contour, although other contours will work as well. Water enters the housing 12 through a water inlet conduit 16, mixes with air entering through an air inlet conduit 18, and then passes through the flexible portion 14 by means of an articulated movable conduit 22 and an outlet end 24. The articulated conduit 22 is shown in several possible positions, and is comprised of a sleeve 26 and a plurality of articulating interconnecting members 28 (FIGS. 2–5). The sleeve 26 has ridges which allow it to flex when bent. Apart from the sleeve 26, which is preferably made of vinyl, the jet 10 is preferably made of moldable plastic, such as PVC.

Figure 2:
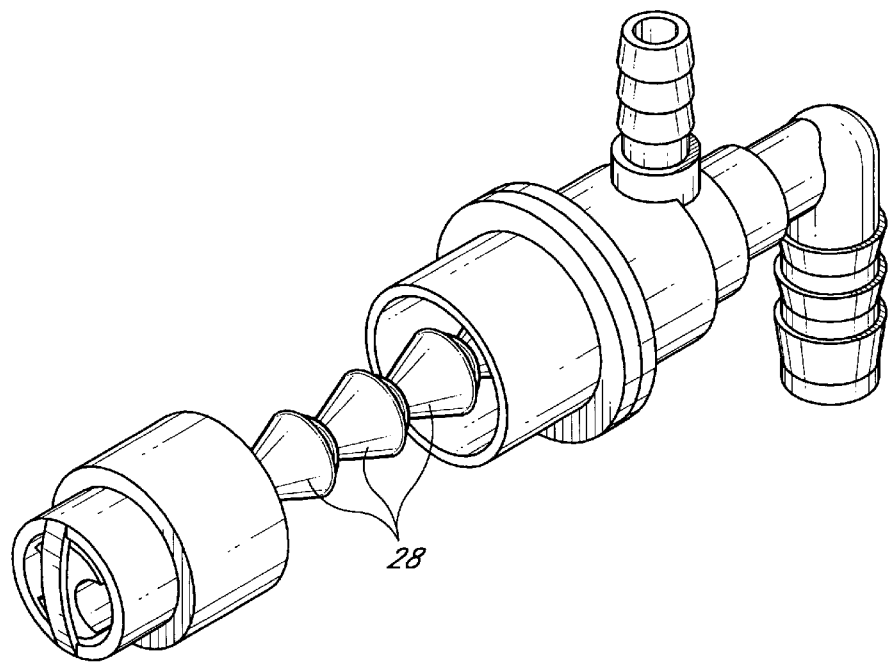
FIG. 2 is a perspective view of a preferred embodiment of the invention with the sleeve removed from the flexible portion.

Referring to FIG. 2, the jet 10 is shown with the sleeve 26 removed from the articulated conduit 22 to reveal the plurality of articulating interconnecting members 28. The interconnecting members 28 hold the flexible portion 14 in a particular position while the air/water stream moves through the members 28. An occupant, however, can move the interconnecting members 28 into a number of positions, if desired.

The path that the water and air take in the jet 10 can be seen in more detail in FIGS. 3–5. The water enters the housing 12 through a first end 30 of the water inlet conduit 16 and passes out a second end 32 of the water inlet conduit 16. The water then passes through a water nozzle 34, and enters a mixing chamber 36, where it mixes with air entering the chamber 36 through the air inlet conduit 18. The air/water mixture is then expelled from the mixing chamber 36 to the flexible portion 14 of the jet 10. Although a stream of water alone produces adequate results, an air/water mixture is preferred because it provides a more stimulating massage for the occupant.

The first end 30 of the water inlet conduit 16 is sized for connection to an inlet water supply pipe. For example, if the housing 12 is molded of PVC, the first end 30 of the water inlet conduit 16 will be sized as a standard slip fitting, to be solvent-cemented, at the time the jet 10 is installed in a tub or spa, to a pressurized PVC water pipe (not shown). The other end of this PVC water pipe, for example, may be connected to a recirculating pump, to supply water under pressure from the spa itself. Alternatively, the other end of the pipe may be connected to a tap water source, especially if the spa is filled at each use.

The second end 32 of the water inlet conduit 16 is set within a recess 38 that matches the outer configuration of the second end 32. Within this recess 38, and axially aligned with the second end 32 of the water inlet conduit 16, the water nozzle 34 is mounted. This nozzle 34 may be press-fit into the recess 38, if different sized nozzles 34 are to be mountable in the jet 10. Alternatively, the nozzle 34 may be mounted permanently, or even molded as a part of the housing 12. In any case, the nozzle 34 includes an inside jet orifice which is generally tapered, and which forms a high speed stream of inlet water. This water exits into the hollow interior of the mixing chamber 36, which interior forms a venturi chamber. This venturi chamber is supplied with air, either at ambient or elevated pressure, through the air inlet conduit 18 which passes through the wall of the housing 12. The air inlet conduit 18 is typically sized to fit snugly within the inside diameter of flexible PVC tubing from the air supply.

Because the nozzle 34 forms a high speed stream, the pressure of the stream is reduced, creating (through the venturi principle) a vacuum within the mixing chamber 36. This vacuum draws air into the mixing chamber 36, and the air becomes entrained in the water stream from the nozzle 34, forming an air/water stream. In a preferred embodiment, the mixing of water and air occurs in the housing 12 and the mixed air/water stream is delivered to the flexible portion 14 and outlet end 24, as described above. However, it is possible to route the air and water to the flexible portion 14 and have the mixing occur in the flexible portion 14, if desired.

This preferred embodiment of the jet 10 includes two parts, the housing 12 and flexible portion 14, that are attached together at the spa or tub wall. However, the jet 10 could also contain the housing 12 and flexible portion 14 in one continuous part, if desired. In either case, the flexible portion 14 extends into the tub. When the jet 10 is comprised of two parts that must be joined, an open end 41 opposite the water inlet conduit 16 of the housing 12 includes an outwardly extending flange 40. An inlet end 42 of the flexible portion 14 is axially aligned with the water nozzle 34 and includes an outwardly extending flange 44. The housing 12 is generally cup shaped, with its open end 41 mounted onto the inlet end 42 of the flexible portion 14 of the jet 10. An aperture in the tub wall (not shown) is sized to receive the housing 12 on one side, and the flexible outlet portion 14 on the other, so that the articulated or flexible portion 14 extends into the tub. The outwardly extending flange 40 clamps onto the flange 44, generally through a threaded interconnection. The outwardly extending flange 44 clamps, in a manner well known in this art, within the main body member 12 and against the inside of the wall of the spa or tub, thereby sandwiching the tub wall between the flange 40 and the flange 44. The region of the housing 12 adjacent the flange 40 may be threaded (not shown) to receive the flange 44 which is similarly threaded (also not shown) of the flexible outlet portion 14 to clamp the flexible portion 14 to the housing 12. This mounting may also be by gluing, if the connection is to be permanent.

After passing through the inlet end 42 of the flexible portion 14 of the jet 10, the air/water stream passes through the articulated conduit 22 and outlet end 24. As described above, in this preferred embodiment, the articulated conduit 22 comprises interconnecting members 28 surrounded by the sleeve 26. The sleeve 26 has ridges that allow it to flex when bent and is attached to the flexible portion 14 at its inlet end 42 and outlet end 24. The sleeve 26 protects the interconnecting members 28. The interconnecting members 28 provide a sealed conduit for the air/water mixture between the inlet end 42 and outlet end 24 of the flexible portion 14. The members 28 also provide a wide range of motion and hold their position when released. As the number of members 28 is increased, the possible range of motion increases. As few as two members 28 are necessary, with four members being shown in this preferred embodiment. In this embodiment, the members 28 are a series of overlapping and articulating knobbed elements. The members 28 have an overlapping end 50 and a knobbed end 52. The knobbed end 52 of the member 28 nearest the inlet end 42 is overlapped by the overlapping end 50 of the member 28 second closest to the inlet end 42. This is repeated for other members 28. The friction formed between the overlapping ends 50 and knobbed ends 52 provides enough resistance to hold the members 28 in position as the air/water mixture passes through them, but not so much resistance that an occupant cannot move the flexible portion 14 into various positions. In the preferred embodiment, the cross sections of both the knobbed end 52 and overlapping end 50 are generally circular. The overlapping end 50 flexes slightly as the knobbed end 52 is press fit into it. As a result, the interconnecting members 28 are slidably connected to one another to form articulating points and to allow for the positioning of the flexible portion 14 of the jet 10. This means for connection allows the overlapping end 50 and knobbed end 52 to slide relative to one another along the overlap, forming a swivel joint, so that the outlet end 24 can be placed at various angles, if desired, relative to the inlet end 42 of the flexible portion 14, but hold their position once released. An occupant can still easily move the flexible portion 14, either intentionally to direct the stream to a certain body area, or unintentionally if an inadvertent collision occurred. The sleeve 26 provides protection from contaminants that could enter the overlapping area and impede the function of the members 28. FIGS. 3, 4, and 5 illustrate the flexible portion 14 and its articulated conduit 22 at several different angles.

After moving through the interconnecting members 28, the air/water mixture enters the outlet end 24 of the flexible portion 14 of the jet 10. The outlet end 24 is mounted to the last of the plurality of interconnecting members 28. The outlet end 24 generally closes and seals the end of the jet 10 from contaminants except at an open end from which the air/water mixture exits the jet 10 from a discharge nozzle 54 to the tub or spa.

The discharge nozzle 54 may be a static output nozzle or may be a rotatable nozzle. In one embodiment, as illustrated in FIGS. 1–4, the discharge nozzle 54 is a rotatable nozzle 56. The rotatable nozzle 56 is a generally Y-shaped tubular conduit, including a single inlet end 58 and a pair of diametrically opposed outlet ends 60 and 62. The rotatable nozzle 56 rotates about an axis which is normal to the outlet end 24, such that the outlet ends 60, 62 rotate in a plane which is parallel to and adjacent the plane of the spa wall. The inlet end 58 is located on the axis of the flexible portion 14 of the jet 10. The rotatable nozzle 56 includes a bearing member which supports the rotatable nozzle 56 for free rotation on a web 63 of the outlet end 24. This bearing supports the axial and radial thrust loads of the rotatable nozzle 56. When the jet 10 is connected to a source of pressurized water and a source of air, the air/water mixture passing through the interconnecting members 28 enters the inlet end 58 of the rotatable nozzle 56. While the rotatable nozzle 56 is generally Y-shaped, as described above, the outlet ends 60, 62, or at least one of these ends, is offset into or out of the plane of FIGS. 3–5, so that the water flowing through the rotatable nozzle 56 includes a tangential component, which creates a tangential thrust on the rotatable nozzle 56. This thrust provides a torque to rotate the nozzle 56. The rate of rotation is controlled by the degree of offset of the outlet ends 60, 62 in the tangential direction, and is moderated by the friction of the water which fills the outlet end 24. In general, the rate of rotation of nozzle 56 is slow enough to provide a rapid pulsing action in the jet 10.

In another embodiment shown in FIGS. 5 and 6, a non-rotating discharge nozzle 55 is used in place of the rotatable nozzle 56.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A hydrotherapy jet for a tub, comprising:
    a body including a water inlet and an air inlet, a chamber for mixing water and air together, an outlet from said chamber and a surface adjacent said outlet for attaching said body to the wall of said tub; and
    an articulated conduit having at least two articulating joints connected to said chamber outlet and adapted to extend into said tub for conducting air and water from said chamber to said tub, said conduit adapted to hold its position in a variety of articulating positions.

2. A method of operating a hydrotherapy jet having a body and an articulated conduit, comprising:
    mixing air and water in the body outside of a tub wall;
    directing the air and water mixture through an aperture in the tub wall; and
    directing the air and water mixture to various locations inside the tub wall by maneuvering an articulated conduit having at least two maneuverable articulating joints.

3. The hydrotherapy jet of claim 1, wherein the body and the articulated conduit are attached by connecting means.

4. The hydrotherapy jet of claim 3, wherein the connecting means includes threads.

5. The hydrotherapy jet of claim 3 wherein the connecting means includes glue.

6. The hydrotherapy jet of claim 1, wherein the articulated conduit has members connected by means whereby the articulated conduit can be manually placed in a variety of positions and will maintain its position when released.

7. The hydrotherapy jet of claim 6 wherein the connecting means is provided by a knobbed element of one member being press fit into an overlapping end of an adjacent member so that the knobbed element and overlapping end are slidably attached to one another.

8. The hydrotherapy jet of claim 7 wherein the press fit forms friction between the knobbed element and overlapping end that impedes the movement of the knobbed element relative to the overlapping end.

9. The hydrotherapy jet of claim 1 wherein the articulated conduit includes a sleeve surrounding the articulated conduit.

10. The hydrotherapy jet of claim 1 wherein said outlet conduit includes an outlet nozzle having a rotating element, the rotating element having an inlet end for receiving water from the articulated conduit, and an outlet end which is offset from the inlet end to provide thrust from the water for rotating the element.

11. The hydrotherapy jet of claim 1, wherein the articulated conduit comprises two or more articulating points.

12. The hydrotherapy jet of claim 1, wherein the articulated conduit comprises two or more swivel joints.

13. The hydrotherapy jet of claim 1, wherein the swivel joints are formed between interconnecting members.

* * * * *